United States Patent [19]

Guillot

[11] Patent Number: 5,498,649

[45] Date of Patent: Mar. 12, 1996

[54] LOW DENSITY THERMOPLASTIC ELASTOMERIC INSULATION FOR ROCKET MOTORS

[75] Inventor: David G. Guillot, Tremonton, Utah

[73] Assignee: Thiokol Corporation, Ogden, Utah

[21] Appl. No.: 63,511

[22] Filed: May 18, 1993

[51] Int. Cl.$^6$ .................... C08K 5/52; C08K 5/3477; C08K 3/32; C08K 3/02

[52] U.S. Cl. .................... 524/100; 523/179; 524/80; 524/178; 524/184; 524/415; 524/416; 524/606

[58] Field of Search .................... 523/179; 525/331.7, 525/66; 524/415, 416, 606, 184, 178, 100, 80

[56] References Cited

U.S. PATENT DOCUMENTS

| | | | |
|---|---|---|---|
| 3,472,812 | 10/1969 | Byrne et al. | 260/41.5 |
| 3,484,403 | 12/1969 | Brunson et al. | 525/184 |
| 3,506,607 | 4/1970 | Bobear | 260/37 |
| 3,562,197 | 2/1971 | Sears et al. | 524/415 |
| 3,666,707 | 5/1972 | Livingston | 260/33.2 |
| 3,723,481 | 3/1973 | Bobear | 260/37 SB |
| 3,755,223 | 8/1973 | Engel | 260/18 PN |
| 4,017,557 | 4/1977 | Hammer et al. | 525/66 |
| 4,205,035 | 5/1980 | Kröger et al. | 264/120 |
| 4,220,733 | 9/1980 | Jones | 525/183 |
| 4,244,858 | 1/1981 | Tacke et al. | 524/416 |
| 4,404,312 | 9/1983 | Kokuba et al. | 525/66 |
| 4,492,779 | 1/1985 | Junior et al. | 523/138 |
| 4,594,386 | 6/1986 | Olivier | 525/66 |
| 4,810,753 | 3/1989 | Koga et al. | 525/184 |
| 4,871,795 | 10/1989 | Pawar | 524/267 |
| 4,878,431 | 11/1989 | Herring | 102/290 |
| 5,071,924 | 12/1991 | Koch et al. | 525/432 |
| 5,252,661 | 10/1993 | Reimann et al. | 525/66 |
| 5,256,718 | 10/1993 | Yamamoto et al. | 524/411 |
| 5,256,719 | 10/1993 | Sham et al. | 525/66 |

OTHER PUBLICATIONS

J. R. Flesher, "Polyether block amide: high-performance TPE," *Modern Plastics*, Sep. 1987.

*Primary Examiner*—Veronica P. Hoke
*Attorney, Agent, or Firm*—Ronald L. Lyons; Madson & Metcalf

[57] ABSTRACT

Thermoplastic elastomeric ablative insulation having low density are disclosed. The ablative insulation is based upon a thermoplastic elastomeric polymer resin containing a polyamide polymer and a maleic anhydride modified EPDM polymer. The ratio of polyamide polymer to maleic anhydride modified EPDM is in the range from about 20:80 to about 40:60. Carefully selected fillers provide suitable charring and ablative insulation performance without unduly increasing the insulation density. Typical fillers include an phosphorus containing compound, such as ammonium polyphosphate, a polyhydric alcohol present, such as pentaerythritol, silicone resin, chopped fibers, an antioxidant, a butadiene polymer, and a peroxide.

19 Claims, No Drawings

LOW DENSITY THERMOPLASTIC ELASTOMERIC INSULATION FOR ROCKET MOTORS

BACKGROUND OF THE INVENTION

1. Field of the Invention

The invention relates to ablative insulation, particularly insulation to protect the interior of a rocket motor from the combustion products of burning propellant. More particularly, the present invention relates to low density thermoplastic elastomeric ablative insulation.

2. Technology Review

The combustion of a propellant in a rocket motor creates a hostile environment characterized by extremely high temperature, pressure, and turbulence. The combustion temperature within the motor often exceeds 6,000° F., and the pressure within the motor frequently exceeds 1,000 psi. Gas velocities typically range from Mach 0.2 in the inlet region to Mach 10+ at the aft end of the rocket motor nozzle. This environment is particularly hostile in a solid rocket motor because its combustion gas contains chemical species and particulates which tend to physically and chemically erode exposed rocket motor nozzle components. While the combustion of a rocket propellant is usually brief, the conditions described above can destroy insufficiently protected or inferior rocket motor parts prematurely and jeopardize the mission of the motor.

Parts of a rocket which are exposed to the high temperatures, pressures, and erosive flow conditions generated by the burning propellant must be protected by a layer of insulation. Various materials have been tried as insulation, such as silica dioxide, glass, or carbon fiber reinforced silicone and/or polyisoprene elastomers, but reinforced resin composite materials are most commonly used. These include phenolic resins, epoxy resins, high temperature melamine-formaldehyde coatings, ceramics, polyester resins and the like. These materials, when cured, usually become rigid structures which crack or blister when exposed to the rapid temperature and pressure changes occurring when the propellant is burned.

The best rocket insulation materials previously known to the art are elastomeric polymers reinforced with asbestos, polybenzimidazole fiber, or polyaramid fiber. These compositions are ablative insulation because they are partially consumed during combustion, but nevertheless they provide protection for the rocket motor. Such materials are capable of enduring in a rocket motor long enough to allow complete combustion of the propellant. Asbestos-reinforced elastomeric insulation is the subject of U.S. Pat. No. 3,421,970, to Daley et al., issued Jan. 14, 1969, and U.S. Pat. No. 3,347,047, to Hartz et al., issued October 17, 1967.

Environmental and health concerns have led manufacturers to seek an acceptable replacement for the asbestos in rocket motor case insulation. One alternative elastomeric insulation contains aramid polymer fibers in combination with a powder filler. That insulation is disclosed in U.S. Pat. No. 4,492,779, assigned to Morton Thiokol, Inc., now known as Thiokol Corporation. A third alternative is elastomeric insulation which contains polybenzimidazole polymer fibers in combination with a powder filler. That insulation is disclosed in U.S. Pat. No. 4,600,372, also assigned to Morton Thiokol, Inc. (See also U.S. Pat. No. 4,507,165.)

Another problem with existing rocket motor insulation is the expense and difficulty of fabricating an insulator and installing it, either as one piece or in sections, within a rocket motor casing. The problems of fabricating thermosetting resinous insulation which is not capable of being cast are described in U.S. Pat. No. 3,177,175, issued to Barry, Jr., on Apr. 6, 1965. While uncured thermosettable resins and elastomers can be formed under heat and pressure in a matched metal die mold, they can only be formed before they cure to a thermoset condition. Typically, both heat and pressure must be exerted during the curing reaction to fuse overlapped segments of insulation into a smooth-surfaced, integral layer. For larger solid rocket motors, precured elastomeric material is often used as insulation. This cured material is laid up and joined within a rocket motor casing with an adhesive to fabricate an insulation member. It is then necessary to machine the insulation to provide a smooth surface which does not have overlapped sections. A further disadvantage of using curable resinous or elastomeric insulation is the time required to cure the insulation sufficiently—between several hours and several days.

To alleviate some of the problems of handling thermosetting materials, insulation consisting of filled polyolefins such as polyethylene or polypropylene has been proposed. Besides the obvious fabrication economies of working with thermoplastic insulation, the prior art has recognized the theoretical superiority of thermoplastic resins for ablative insulation because they undergo endothermic pyrolysis, carrying heat away from the insulation. Thermoplastic resins also have high specific heats, and their pyrolysis products have high specific heats and low molecular weights. The theoretical superiority of thermoplastic resins is recognized in U.S. Pat. No. 3,395,035, issued to Strauss on Jul. 30, 1968 (column 6, lines 39–53); and U.S. Pat. No. 3,397,168, issued to Kramer et al., on Aug. 13, 1968 (column 2, lines 15–19; column 3, lines 4–5).

Thermoplastic resin-based material readily melts and flows when subjected to heat. (See the Kramer et al. patent previously cited, column 1, line 64 to column 2, line 4.) Therefore, the art teaches that thermoplastic resins used in ablative insulation must be combined with thermosetting resins and impregnated into a refractory or fiber matrix to prevent the insulation from melting and running off when exposed to the extreme heat and erosion of a rocket motor.

Because insulation represents inert weight of a rocket motor, it would be desirable in some applications to replace high density insulation with lower density insulation of comparable performance.

It would, therefore, be a significant advancement in the art to provide thermoplastic elastomeric ablative insulation materials having low density.

Such low density thermoplastic elastomeric ablative insulation materials are disclosed and claimed herein.

SUMMARY OF THE INVENTION

The invention is directed to low density thermoplastic elastomeric ablative insulation. While conventional ablative insulations have densities in the range from about 1.05 gm/cm³ to about 1.28 gm/cm³, the ablative insulation materials of the present invention have densities in the range from about 0.98 gm/cm³ to about 1.15 gm/cm³. It will be appreciated that the density is affected by the choice fillers. The insulation of the present invention is based upon a polymer system comprised of a polyamide polymer resin and maleic anhydride modified EPDM (ethylenepropylenediene monomer) polymer. Carefully selected fillers are included to provide suitable charring and ablative insulation performance. Since fillers increase the density of the insulation, use of fillers that are particularly effective permits lower quantities of fillers to be used, thereby further reducing the density of the insulation.

A typical low density insulation within the scope of the present invention includes a polyamide polymer resin combined with a maleic anhydride modified EPDM polymer, and a phosphorus containing compound. A polyhydric alcohol, chopped fiber filler, silicone resin, a polybutadiene, and an anti-oxidant are optionally included in the insulation to impart desired processing, mechanical, and ablative properties.

Several advantages of the low density thermoplastic insulation and method described herein are that the material can be made up in advance and remelted in bulk, it can be heat sealed or otherwise reformed after it is fabricated, and it does not require curing. These advantages can be achieved without sacrificing the ablative performance of vulcanized or other thermosetting insulation.

DETAILED DESCRIPTION OF THE INVENTION

The present invention is directed to low density thermoplastic elastomeric ablative insulation. The insulation is based upon a polymer system comprising a polyamide polymer resin and a maleic anhydride (MA) modified EPDM (ethylenepropylenediene monomer) polymer. Carefully selected fillers are included to provide suitable charring and ablative insulation performance. Since fillers increase the density of the insulation, use of fillers that are particularly effective permits lower quantities of fillers to be used, thereby further reducing the density of the insulation.

The ablative insulations within the scope of the present invention include the following ingredients:

| Ingredient | phr |
|---|---|
| polyamide polymer } MA modified EPDM | 100 |
| phosphorus compound | 5–60 |
| polyhydric alcohol | 0–30 |
| silicone resin | 0–15 |
| chopped fiber filler | 0–100 |
| antioxidant | 0–2 |
| butadiene | 0–15 |
| peroxide | <1 |

The term "phr" means "parts per hundred parts resin by weight."

The thermoplastic elastomeric polymeric resin used in the insulation materials of the present invention includes a polyamide polymer, such as a nylon polymer, preferably Nylon 12, blended with a maleic anhydride modified EPDM polymer (hereinafter referred to as "maleated EPDM"). Maleated EPDM is chemically modified EPDM by incorporation of reactive groups from maleic anhydride. Maleated EPDM polymers are well known to those skilled in the art. A range of maleated EPDM polymers is sold under the trademark Royaltuf® by Uniroyal Chemical Company, Middlebury, Conn. One currently preferred maleated EPDM polymer are Royaltuf® 465A having a maleation level of about 0.4%. The ratio of polyamide polymer to maleated EPDM polymer is in the range from about 20:80 to about 40:60, with a ratio of about 30:70 being particularly preferred.

The phosphorus containing compound is present in the range from about 5 phr to about 60 phr, more preferably in the range from about 20 phr to about 30 phr. Preferred phosphorus containing compounds which may be used in the present invention include phosphates, phosphazenes, and elemental (red) phosphorous. Ammonium polyphosphates are particularly preferred phosphorus containing compounds. One currently preferred ammonium polyphosphate is sold under the trademark Phos-Chek® by Monsanto, Saint Louis, Miss., having the general formula $(NH_4)_{n+2}P_nO_{3n+1}$ where n is from 1000 to 3000. Another ammonium polyphosphate is sold under the trademark EXOLIT® by Hoechst Celanese, Charlotte, N.C. Another phosphorus containing compound which can be used in the insulation materials of the present invention is melamine amylphosphate.

The polyhydric alcohol may be present in the ablative insulation ranging up to about 30 phr, more preferably present from about 5 phr to about 10 phr. Typical polyhydric alcohols for use in the present invention are acyclic and cyclic compounds having a plurality of hydroxyl groups attached thereto such as pentaerythritol, dipentaerythritol, and tripentaerythritol. It is believed that the polyhydric alcohol acts as an additional carbon source to increase the amount of char formation.

The insulation materials of the present invention optionally include silicone resin ranging up to about 15 phr. One currently preferred silicone resin is sold by GE Silicons, Waterford, N.Y. under the tradename, SFR-100. It is particularly adapted for heat resistant applications. It had a viscosity in the range from 200,000 cps to 900,000 cps at 25° C. Other similar silicone resins may also be used.

Although the chopped fiber filler may be present in the ablative insulation up to about 100 phr, it more preferably ranges from about 1 phr to about 20 phr. Currently preferred examples of chopped fibers which may be used within the scope of the present invention include chopped polybenzimidazole ("PBI") fiber, chopped aramid polymer fibers such as Kevlar®, Kevlar®29, and Kevlar®49, and Nomex® sold by DuPont, and ceramic fibers such as Nextel® fibers sold by 3M. The chopped fibers are preferably small, about ⅛ inch long.

The thermoplastic ablative insulation within the scope of the present invention optionally includes an antioxidant, such as those commonly used in with thermoplastic resins. Currently preferred antioxidants include phenolics, such as the hindered phenol tetrakis(methylene(3,5-di-tert-butyl-4-hydroxyhydrocinnamate))methane, sold by Ciba-Geigy under the tradename Irganox® 1010; phosphites, such as 2,2'-ethylidene-bis(4,6-di-tert-butylphenyl)fluorophosphite, sold by Ethyl Corporation under the tradename Ethanox® 398 or bis(2,4-di-tert-butylphenyl)pentaerythritoldiphosphite, sold by GE Specialty Chemicals under the tradename Ultranox® 627A; and amine-type antioxidants, such as polymerized 1,2-dihydro-2,2,4-trimethylquinone, sold by R.T. Vanderbilt under the tradename Agerite® Resin D. An additional benefit from using a phosphite antioxidant is that it provides a source of phosphorus. Thus, some of the phosphorus compound may be replaced by a phosphite antioxidant.

The insulation compositions within the scope of the present invention optionally include a butadiene polymer, such as hydroxy terminated polybutadiene (HTPB). When used, the HTPB is preferably used in amounts in the range from about 3 phr to about 15 phr.

A small amount of peroxide, less than 1 phr, may be added to the insulation materials of the present invention to partially cross-link or harden the butadiene to improve bonding or adherence to the fiber.

Importantly, the thermoplastic insulation materials described herein may be shaped or molded as desired and used without the typical curing required in the prior art. In addition, the ablative insulations of the present invention can be prepared in advance and remelted in bulk. They can also be heat sealed or otherwise reformed after fabrication. These advantages can be achieved without sacrificing the ablative performance of vulcanized or other thermosetting insulation.

The following examples are offered to further illustrate the present invention. These examples are intended to be purely exemplary and should not be viewed as a limitation on any claimed embodiment.

Example 1

A low density thermoplastic elastomeric ablative insulation was prepared having the following ingredients:

| Ingredient | phr |
| --- | --- |
| Grilamid ® ELY2742 | 30 |
| Royaltuf ® 465A EPDM | 70 |
| Aerosil ® R974 | 10 |
| Phos-Chek ® P-40 | 5 |
| Austin Black 325 | 35 |

The Grilamid® ELY2742, a polyamide polymer, nylon 12, was obtained from EMS-American Grilon Inc. The Royaltuf® 465A maleated EPDM resin was obtained from Uniroyal Chemical Company, Middlebury, Conn. The Aerosil® R974, fumed silica (hydrophobic), was obtained from Degussa Corp. The Phos-Chek® P-40, ammonium polyphosphate, was obtained from Monsanto, Saint Louis, Miss. The Austin Black 325, powdered low volatile bituminous coal, was obtained from VenBlack, Inc., Sophia, W.Va.

The polyamide resin was heated to flux and then the maleated EPDM was added and mixed for 10 minutes. The ammonium polyphosphate and the fillers were then added. The ingredients were mixed using a conventional internal mixer (Brabender) and a continuous mixing twin screw extruder (Twin Screw). The final insulation was molded at 350° F.

Tensile strength, percent elongation, and density were measured for the ablative insulation prepared by both mixing techniques. The results are as follows:

| Mechanical Properties | | |
| --- | --- | --- |
| | Twin Screw | Brabender |
| Tensile Strength, psi | | |
| Parallel | 1296 | 1154 |
| Perpendicular | 1301 | |
| Elongation at Failure, % | | |
| Parallel | 223 | 369 |
| Perpendicular | 213 | |
| Density, gm/cm³ | 1.03 | 1.02 |

The performance of this insulation material was examined in a charmotor study and found to provide insulation performance comparable to the known TPE insulation material TIR-701 (polyisoprene and Kevlar®) obtained from Kirkhill Rubber Company having a density of 1.16 gm/cm³.

Example 2

A low density thermoplastic elastomeric ablative insulation was prepared having the following ingredients:

| Ingredient | phr |
| --- | --- |
| Grilamid ® ELY2742 | 30 |
| Royaltuf ® 465A EPDM | 70 |
| Aerosil ® R974 | 10 |
| Phos-Chek ® P-40 | 5 |
| Austin Black 325 | 90 |
| Kevlar ®, ⅛" cut | 11.5 |

The Kevlar®, polyaramid fiber, was obtained from DuPont. The remaining ingredients are described in Example 1.

The insulation was prepared by first mixing the Austin Black and fiber. The polyamide resin was then heated to flux and the maleated EPDM was added and mixed for 10 minutes. The ammonium polyphosphate and the fillers were added, and the ingredients were mixed using a conventional internal mixer. The final insulation was molded at 350° F.

Tensile strength, percent elongation, and density were measured for the ablative insulation. The results are as follows:

| Mechanical Properties | |
| --- | --- |
| Tensile Strength, psi | |
| Parallel | 1820 |
| Elongation at Failure, % | |
| Parallel | 13 |
| Density, gm/cm³ | 1.12 |

Example 3

A low density thermoplastic elastomeric ablative insulation was prepared according to the procedure of Example 2, except that the Kevlar® fiber was replaced by an equal amount of PBI fiber, ⅛".

Tensile strength, percent elongation, and density were measured for the ablative insulation. The results are as follows:

| Mechanical Properties | |
| --- | --- |
| Tensile Strength, psi | |
| Parallel | 1776 |
| Elongation at Failure, % | |
| Parallel | 13 |
| Density, gm/cm³ | 1.12 |

Example 4

A low density thermoplastic elastomeric ablative insulation was prepared having the following ingredients:

| Ingredient | phr |
| --- | --- |
| Grilamid ® ELY2742 | 30 |
| Royaltuf ® 465A EPDM | 70 |
| Phos-Chek ® P-40 | 24 |

The ingredients are described in Example 1.

The polyamide resin was heated to flux and then the maleated EPDM was added and mixed for 10 minutes. The ammonium polyphosphate was then added. The ingredients were mixed using a conventional internal mixer. The final insulation was molded at 350° F.

Tensile strength, percent elongation, and density were measured for the ablative insulation. The results are as follows:

| Mechanical Properties | |
|---|---|
| Tensile Strength, psi | |
| Parallel | 1612 |
| Elongation at Failure, % | |
| Parallel | 719 |
| Density, gm/cm³ | 1.00 |

Example 5

A low density thermoplastic elastomeric ablative insulation was prepared having the following ingredients:

| Ingredient | phr |
|---|---|
| Grilamid ® ELY2742 | 30 |
| Royaltuf ® 465A EPDM | 70 |
| Pentaerythritol PE200 | 7 |
| Phos-Chek ® P-40 | 24 |
| Silicone resin, SFR-100 | 7 |
| PBI chopped fiber, ⅛ inch | 7.5 |

The pentaerythritol PE200 was obtained from Aqualon Company, Wilmington, Del. The silicone resin, SFR-100, was obtained from GE Silicons, Waterford, N.Y. It had a viscosity in the range from 200,000 cps to 900,000 cps at 25° C. The PBI (polybenzimidazole) chopped fiber was obtained from Celanese, Charlotte, N.C. The remaining ingredients are described in Example 1.

The polyamide resin was heated to flux and then the maleated EPDM was added and mixed for 10 minutes. The ammonium polyphosphate, fillers, and fibers were then added. The ingredients were mixed using a conventional internal mixer. The final insulation was molded at 350° F. The density of the resulting insulation was 1.03 gm/cm³.

The performance of this insulation material was examined in a charmotor study and found to be comparable to the known TPE insulation material TIR-701 (polyisoprene and Kevlar®) obtained from Kirkhill Rubber Company.

Example 6

A low density thermoplastic elastomeric ablative insulation was prepared having the following ingredients:

| Ingredient | phr |
|---|---|
| Grilamid ® ELY2742 | 30 |
| Royaltuf ® 465A EPDM | 70 |
| Pentaerythritol PE200 | 7 |
| Phos-Chek ® P-40 | 24 |
| Silicone resin, SFR-100 | 7 |

The remaining ingredients are described in Example 5.

The polyamide resin was heated to flux and then the maleated EPDM was added and mixed for 10 minutes. The ammonium polyphosphate, fillers, and fibers were then added. The ingredients were mixed using a conventional internal mixer. The final insulation was molded at 350° F. The density of the resulting insulation was 1.01 gm/cm³.

Example 7

A low density thermoplastic elastomeric ablative insulation was prepared according to the procedure of Example 5, except that 12 phr PBI fiber, ⅛" was included in the insulation. The density of the resulting insulation was 1.04 gm/cm³.

Example 8

A low density thermoplastic elastomeric ablative insulation is prepared having the following ingredients:

| Ingredient | phr |
|---|---|
| Grilamid ® ELY2742 | 20 |
| Royaltuf ® 465A EPDM | 80 |
| Phos-Chek ® P-40 | 24 |

The ingredients are described in Example 1.

The polyamide resin is heated to flux and then the maleated EPDM is added and mixed for 10 minutes. The ammonium polyphosphate is then added. The ingredients are mixed using a conventional internal mixer. The final insulation is molded at 350° F. Tensile strength, percent elongation, and density for the ablative insulation are expected to be comparable to those of Example 4.

Example 9

A low density thermoplastic elastomeric ablative insulation is prepared having the following ingredients:

| Ingredient | phr |
|---|---|
| Grilamid ® ELY2742 | 40 |
| Royaltuf ® 465A EPDM | 60 |
| Phos-Chek ® P-40 | 24 |

The ingredients are described in Example 1.

The polyamide resin is heated to flux and then the maleated EPDM is added and mixed for 10 minutes. The ammonium polyphosphate is then added. The ingredients are mixed using a conventional internal mixer. The final insulation is molded at 350° F. Tensile strength, percent elongation, and density for the ablative insulation are expected to be comparable to those of Example 4.

From the foregoing it will be appreciated that the present invention provides thermoplastic elastomeric ablative insulation materials having low density.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A low density thermoplastic elastomeric ablative insulation comprising:
   a thermoplastic elastomeric polymer resin containing a polyamide polymer and a maleic anhydride modified ethylene-propylene-diene terpolymer polymer, wherein the weight ratio of polyamide polymer to maleic anhydride modified ethylene-propylene-diene terpolymer is in the range from about 20:80 to about 30:70; and a phosphorus-containing compound selected from ammonium polyphosphates, phosphazenes, elemental (red) phosphorous, melamine amylphosphate, and mixtures thereof present in the insulation from about 20 phr to about 30 phr.

2. A low density thermoplastic elastomeric ablative insulation as defined in claim 1, wherein the phosphorus-containing compound is ammonium polyphosphate.

3. A low density thermoplastic elastomeric ablative insulation as defined in claim 1, further comprising a polyhydric alcohol is present in the insulation in the range from about 1 phr to about 30 phr.

4. A low density thermoplastic elastomeric ablative insulation as defined in claim 3, wherein the polyhydric alcohol is pentaerythritol, dipentaerythritol, or tripentaerythritol.

5. A low density thermoplastic elastomeric ablative insulation as defined in claim 1, further comprising a silicone resin present in the insulation in range from about 0 phr to about 15 phr.

6. A low density thermoplastic elastomeric ablative insulation as defined in claim 1, further comprising chopped fiber filler present in the insulation in range from about 1 phr to about 100 phr.

7. A low density thermoplastic elastomeric ablative insulation as defined in claim 1, further comprising chopped fiber filler present in the insulation in range from about 1 phr to about 20 phr.

8. A low density thermoplastic elastomeric ablative insulation as defined in claim 6, wherein the chopped fiber filler is ⅛ inch chopped polybenzimidazble fiber.

9. A low density thermoplastic elastomeric ablative insulation as defined in claim 6, wherein the chopped fiber filler is an aramid polymer fiber.

10. A low density thermoplastic elastomeric ablative insulation as defined in claim 6, wherein the chopped fiber filler is a ceramic fiber.

11. A low density thermoplastic elastomeric ablative insulation as defined in claim 1, further comprising an antioxidant present in the insulation up to about 2 phr.

12. A low density thermoplastic elastomeric ablative insulation comprising:

a thermoplastic elastomeric polymer resin containing a polyamide polymer and a maleic anhydride modified ethylene-propylene-diene terpolymer polymer, wherein the weight ratio of polyamide polymer to maleic anhydride modified ethylene-propylene-diene terpolymer is in the range from about 20:80 to about 30:70; and ammonium polyphosphate present in the insulation from about 20 phr to about 30 phr;

polyhydric alcohol present in the insulation from about 5 phr to about 10 phr;

chopped fiber filler present in the insulation in range from about 1 phr to about 100 phr; and an antioxidant present in the insulation in range from about 0 phr to about 2 phr.

13. A low density thermoplastic elastomeric ablative insulation as defined in claim 12, wherein the ammonium polyphosphate is present in the range from about 20 phr to about 25 phr, wherein the polyhydric alcohol is pentaerythritol present in the range from about 5 phr to about 10 phr, and wherein the chopped fiber filler is present in the range from about 1 phr to about 20 phr.

14. A low density thermoplastic elastomeric ablative insulation as defined in claim 13, further comprising hydroxy terminated polybutadiene present in the range from about 2 phr to about 10 phr.

15. A low density thermoplastic elastomeric ablative insulation as defined in claim 13, further comprising silicone resin present in the range from about 0 phr to about 15 phr.

16. A low density thermoplastic elastomeric ablative insulation as defined in claim 12, wherein the ammonium polyphosphate is present in the range from about 20 phr to about 25 phr, wherein the polyhydric alcohol is dipentaerythritol present in the range from about 5 phr to about 10 phr, and wherein the chopped fiber filler is present in the range from about 1 phr to about 20 phr.

17. A low density thermoplastic elastomeric ablative insulation as defined in claim 16, further comprising hydroxy terminated polybutadiene present in the range from about 2 phr to about 10 phr.

18. A low density thermoplastic elastomeric ablative insulation as defined in claim 16, further comprising silicone resin present in the range from about 0 phr to about 15 phr.

19. A low density thermoplastic elastomeric ablative insulation as defined in claim 12, wherein the ratio of polyamide polymer to maleic anhydride modified ethylene-propylene-diene terpolymer is about 30:70.

* * * * *